Patented May 25, 1943

2,319,957

UNITED STATES PATENT OFFICE 2,319,957

COATED PAPER

John K. Speicher, Newark, Del., assignor to Hercules Powder Company, Wilmington, Del., a corporation of Delaware No Drawing. Application September 11, 1941, Serial No. 410,437

6 Claims. (Cl. 117—157)

This invention relates to improved coated cellulosic sheet materials and to a method of production thereof. More particularly it relates to improved wax-coated cellulosic sheet materials characterized by having a hard, tough, non-smearing, moisture-resisting surface and to a method of producing the same.

Cellulosic sheet materials, such as for example paper, have been coated with various waxes to provide moisture-resistant and moisture-vapor-proof coatings. Paraffin wax has been generally used for such coatings although certain of the higher melting waxes have also found certain limited application. Such wax coatings, although used in large volume commercially for bread wrappers, cake wrappers, etc., are deficient in several respects. They are usually characterized by very poor scuff and mar resistance, by a lack of toughness and by a pronounced tendency to smear. Their moisture vapor resistance is generally satisfactory. Efforts have been made to incorporate resins with the wax to increase the hardness of the coating and to improve the gloss. Inclusion of resins, however, does not materially improve the toughness of the coating and does not overcome the smearing tendencies unless the amount of resin incorporated is so large as to yield a resinous rather than a waxy coating.

It is an object of this invention to provide a coated cellulosic sheet material having a surface coating which is characteristically waxy in nature but which is hard, tough, moisture-vapor-proof and non-smearing.

It is another object to provide a method of coating cellulosic sheet materials to provide thereon a surface coating having the above-defined characteristics.

The above objects are accomplished in accordance with this invention by applying to a cellulosic sheet material a fused composition consisting of from about 50% to about 90% by weight of a wax and from about 50% to about 10% by weight of ethyl cellulose having an ethoxyl content in the range of from about 40% to about 55%. Preferably, the composition will consist of 70% to 90% by weight of a wax and the remainder ethyl cellulose. The method of application does not require use of any volatile solvents and involves applying the molten composition at a temperature from about 90° C. to about 180° C. and then allowing the coating to solidify by cooling. Tightly adherent coatings without substantial impregnation of the foundation are obtained.

The ethyl cellulose which may be utilized in the compositions of this invention will have a substitution in the range of from about 40% to about 55% ethoxyl, preferably in the range from about 46% to about 50%. The viscosity of the ethyl cellulose may be varied as desired and will generally be from about one second to about eight seconds, and preferably from about two seconds to about four seconds, as measured by noting the time of fall of a $\frac{1}{16}$ inch steel ball through 10 inches of solution contained in a glass tube 25 mm. in diameter at 25° C., the solution consisting of 20% by weight of ethyl cellulose dissolved in a solvent consisting of 80% by weight of toluene and 20% by weight of ethyl alcohol.

The waxes and wax-like materials which are employed in the compositions of the invention fall into two general classes, namely those which are compatible with ethyl cellulose and those which are either incompatible or have limited compatibility. Both types of waxes may be used. Waxes which are compatible with and exert a solvent action on ethyl cellulose are for example, montan wax, beeswax, candelilla wax, Japan wax, spermacetti wax, stearic acid, "Opalwax" (a hydrogenated castor oil product), carnauba wax, stearin pitch, gilsonite, coal tar, as well as others. Waxes and wax-like materials which are incompatible with ethyl cellulose and are useful in the invention are for example, the petroleum and mineral hydrocarbon waxes such as ceresin, ozokerite, paraffin, etc.; Chinese insect wax, amorphous plastic waxes such as the "Superla," "Syncera," "Circasol" waxes, etc.

In preparing the coating compositions used in the invention the ethyl cellulose is preferably first dissolved in a wax with which it is compatible and in which it is soluble at the elevated temperatures used in the process. The solution of the ethyl cellulose in such a wax is desirably carried out by heating the wax to a temperature in the range of about 125° C. to about 200° C. and adding the ethyl cellulose with agitation until complete solution is obtained. If an incompatible type of wax is to be used in the composition it may be added conveniently to the solution of the ethyl cellulose in the compatible wax. In this manner incorporation of large amounts of the incompatible waxes is made possible. If desired the hot wax-ethyl cellulose mixture may be filtered to remove any foreign materials and will then be suitable for application according to the process of the invention.

The amounts of ethyl cellulose and wax utilized in the coating compositions of the invention will be varied within the broad ranges stated above, depending on the particular waxes utilized and the particular properties desired in the coated cellulosic sheet material. Thus, for example, with the softer waxes a larger proportion of the ethyl cellulose will be necessary to provide the hard and tough characteristics in the finished coating. On the other hand, with the harder waxes a proportionately smaller percentage of ethyl cellulose will be required. It will generally be desirable to include a sufficient amount of a wax which is compatible with ethyl cellulose in the composition to insure homogeneity of the composition under the conditions of application. The ethyl cellulose and wax components of the coating compositions will be adjusted in any event to provide a finished fused composition having a drop melting point within the range of about 70° C. to about 150° C. and preferably from about 70° C. to about 110° C. It has been found that adjustment of the ethyl cellulose and wax components in the above ranges to give compositions melting as above is necessary to provide the essential characteristics of the coated sheet materials produced in accordance with this invention.

The waxy coating compositions are applied to the cellulosic sheet materials in accordance with the process of this invention without the use of any volatile solvents. Thus the cost and fire hazards attending use of solvents are completely avoided. A further advantage of the molten application is the fact that substantially no impregnation of the foundation occurs, while tightly adherent coatings result. The temperature of application will determine to a certain extent the thickness of coating obtained and must be varied with the melting point of the coating composition itself. Generally speaking, a coating temperature within the range of about 90° C. to about 180° C. will be desirable, a temperature of about 135° C. to about 180° C. being preferred. The coating may be applied by use of roller coating machines, gravure printing machines or other paper coating machines which are equipped with suitable means for applying molten coatings and for smoothing the coating agent after application. Alternatively, the compositions may be applied by a dipping operation, particularly for the coating of shaped articles, such as pulp or paper milk bottles, containers, etc. Immediately after application of the hot coating composition to the base material, the coating is smoothed by any suitable means such as for example by application of radiant heat, by a doctor blade or in the case of the compositions of relatively low viscosity simply by allowing the composition to flow out before cooling. The coating is then allowed to solidify by cooling. The thickness of coating may be varied as desired and will depend to a certain extent on the particular sheet material being coated and on the use to which the coated material will be subjected. Generally speaking, a coating thickness of from about 0.0001 to about 0.005 inch will be suitable.

The cellulosic sheet materials to which the coating may be applied will be for example, a fibrous cellulosic sheet such as paper, glassine paper, paper board, etc.; a non-fibrous cellulosic sheet such as regenerated cellulose sheet known in the trade as "Cellophane"; a cellulose derivative sheet as for example, cellulose acetate sheet, any of such sheet materials in the form of shaped articles, etc., or suitable cloth materials. A particular advantage of the invention will be found in the coating of paper stock which has been printed. On such printed stock which has been printed with for example, drying oil inks, aniline inks, rotogravure inks, and starch bound water-dispersible inks, the improved coating compositions will provide highly satisfactory coated products.

The coated cellulose sheet materials prepared in accordance with the process of this invention will be characterized by having a surface coating which is characteristically waxy in nature and which is hard, tough, moisture-vaporproof and non-smearing. It will be further characterized by having a surface coating comprising a fused composition consisting of from about 50% to about 90% by weight of a wax and from about 50% to about 10% by weight of ethyl cellulose.

The coated cellulosic sheet materials obtained in accordance with this invention will be useful in the various applications of such sheet materials where the characteristics of moisture-resistance, toughness and non-smearing are highly desirable, for example in bread wrappers, cake wrappers, etc.

The various embodiments of the invention are illustrated in the following specific examples:

Example 1

Twenty parts by weight of ethyl cellulose having an ethoxyl content of 47.5% and a viscosity of about 3 to 4 seconds were dissolved in 80 parts by weight of stearic acid by first heating the stearic acid to a temperature of 125° C. and gradually adding the ethyl cellulose with agitation until complete solution took place. The composition obtained had a melting point of 80° C. It was applied to paper on a coating machine and the coating smoothed. The coated paper resulting showed improved gloss, was scuff-resistant and smear-resistant. It was substantially moisture proof.

Example 2

Thirty-five parts by weight of montan wax were heated to a temperature of 150° C. and 11 parts of ethyl cellulose having an ethoxyl content of 48% were then added gradually with agitation until complete solution took place. To the hot mixture 54 parts by weight of paraffin wax were added gradually with stirring. The homogeneous fused composition resulting had a melting point of 75° C. It was applied to glassine paper to give a clear thin coating which was flexible, scuff-resistant, smear-resistant and moisture-vaporproof.

Example 3

Eighty-five parts by weight of "Opalwax" were heated to a temperature of about 165° C. and 15 parts by weight of ethyl cellulose having an ethoxyl content of 47.5% added with agitation. The ethyl cellulose dissolved rapidly in the wax and a homogeneous composition resulted which had a drop melting point of 105° C. The hot composition was applied to paper to give a smooth, glossy, scuff and smear-resistant paper of high moisture resistance.

Example 4

Seventy parts by weight of "Opalwax" were heated to a temperature of 165° C., and 30 parts by weight of ethyl cellulose having an ethoxyl content of 47.5% added gradually with agitation until a homogeneous solution resulted. The resulting composition had a melting point of 130° C. On application to paper by means of a coating machine it provided a coated paper of high gloss, high moisture-vaporproofness, and excellent scuff and smear-resistance.

It will be understood that the details and examples hereinbefore set forth are illustrative only and that the invention as broadly described and claimed is in no way limited thereby.

What I claim and desire to protect by Letters Patent is:

1. A cellulosic sheet material carrying a waxlike, moisture-resistant, scuff-resistant, nontacky surface coating, applied thereto without substantial impregnation thereof, of a fused composition having a melting point within the range of about 70° C. to about 150° C. and consisting of a wax and ethyl cellulose, the percentage of ethyl cellulose being in excess of 10% by weight but not more than 50%, and the percentage of wax being at least 50% by weight and less than 90% by weight, the ethoxyl content of the said ethyl cellulose being in the range from about 40% to about 55%.

2. A cellulosic sheet material carrying a waxlike, moisture-resistant, scuff-resistant, nontacky surface coating, applied thereto without substantial impregnation thereof, of a fused composition having a melting point within the range of about 70° C. to about 150° C. and consisting of a wax and ethyl cellulose, the percentage of ethyl cellulose being in excess of 10% by weight but not more than 50%, and the percentage of wax being at least 50% by weight and less than 90% by weight, the ethoxyl content of the said ethyl cellulose being in the range from about 46% to about 50%.

3. A cellulosic sheet material carrying a waxlike, moisture-resistant, scuff-resistant, nontacky surface coating, applied thereto without substantial impregnation thereof, of a fused composition having a melting point within the range of about 70° C. to about 110° C. and consisting of a wax and ethyl cellulose, the percentage of ethyl cellulose being in excess of 10% by weight but not more than 50%, and the percentage of wax being at least 50% by weight and less than 90% by weight, the ethoxyl content of the said ethyl cellulose being in the range from about 46% to about 50%.

4. A cellulosic sheet material carrying a waxlike, moisture-resistant, scuff-resistant, nontacky surface coating, applied thereto without substantial impregnation thereof, of a fused composition having a melting point within the range of about 70° C. to about 150° C. and consisting of montan wax and ethyl cellulose, the percentage of ethyl cellulose being in excess of 10% by weight but not more than 30%, and the percentage of montan wax being at least 70% by weight and less than 90% by weight, the ethoxyl content of said ethyl cellulose being in the range from about 46% to about 50%.

5. A cellulosic sheet material carrying a waxlike, moisture-resistant, scuff-resistant, nontacky surface coating, applied thereto without substantial impregnation thereof, of a fused composition having a melting point within the range of about 70° C. to about 150° C. and consisting of a wax containing paraffin wax as the principal component and ethyl cellulose, the percentage of ethyl cellulose being in excess of 10% by weight but not more than 30%, and the percentage of wax being at least 70% by weight and less than 90% by weight, the ethoxyl content of said ethyl cellulose being in the range from about 46% to about 50%.

6. A cellulosic sheet material carrying a waxlike, moisture-resistant, scuff-resistant, nontacky surface coating, applied thereto without substantial impregnation thereof, of a fused composition having a melting point within the range of about 70° C. to about 150° C. and consisting of ethyl cellulose and a wax containing hydrogenated castor oil as the principal component, the percentage of ethyl cellulose being in excess of 10% by weight but not more than 30%, and the percentage of wax containing hydrogenated castor oil as the principal component being at least 70% by weight and less than 90% by weight, the ethoxyl content of the said ethyl cellulose being in the range from about 46% to about 50%.

JOHN K. SPEICHER.